US009470154B2

(12) United States Patent
Rajagopalan et al.

(10) Patent No.: US 9,470,154 B2
(45) Date of Patent: Oct. 18, 2016

(54) TRANSITION FROM HOMOGENEOUS CHARGE COMPRESSION IGNITION COMBUSTION MODE TO SPARK IGNITED COMBUSTION

(71) Applicant: GM GLOBAL TECHNOLOGY OPERATIONS LLC, Detroit, MI (US)

(72) Inventors: Sai S. V. Rajagopalan, Sterling Heights, MI (US); Jun-Mo Kang, Ann Arbor, MI (US); Kevin Andrew Gady, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 811 days.

(21) Appl. No.: 13/906,965

(22) Filed: May 31, 2013

(65) Prior Publication Data
US 2014/0352655 A1 Dec. 4, 2014

(51) Int. Cl.
  *F02D 13/02* (2006.01)
  *F02D 41/30* (2006.01)
  *F02B 1/14* (2006.01)
  *F02B 5/02* (2006.01)

(52) U.S. Cl.
  CPC ............ *F02D 13/02* (2013.01); *F02B 1/14* (2013.01); *F02B 5/02* (2013.01); *F02D 13/0207* (2013.01); *F02D 41/3064* (2013.01); *F02D 41/3011* (2013.01); *F02D 41/3017* (2013.01); *Y02T 10/128* (2013.01); *Y02T 10/18* (2013.01)

(58) Field of Classification Search
  CPC .............. F02D 13/02; F02D 13/0203; F02D 13/0207; F02D 41/3011; F02D 41/3017; F02D 41/3023; F02D 41/3029; F02D 41/3064; F02D 41/307; F02D 2250/21; Y02T 10/128; Y02T 10/18
  See application file for complete search history.

(56) References Cited

U.S. PATENT DOCUMENTS

| 7,213,566 | B1 * | 5/2007 | Jankovic | F02D 37/02 123/302 |
|---|---|---|---|---|
| 2007/0144480 | A1 * | 6/2007 | Herweg | F02D 41/3035 123/295 |
| 2008/0066715 | A1 * | 3/2008 | Jankovic | F02B 17/005 123/302 |
| 2009/0031985 | A1 * | 2/2009 | Kuzuyama | F02B 1/12 123/27 GE |
| 2009/0064950 | A1 * | 3/2009 | Rayl | F01L 1/185 123/90.15 |

(Continued)

*Primary Examiner* — Erick Solis
*Assistant Examiner* — Anthony L Bacon
(74) *Attorney, Agent, or Firm* — Quinn Law Group, PLLC

(57) ABSTRACT

A method of controlling an engine includes initiating a transition from homogenous charge compression ignition (HCCI) to spark ignited (SI) combustion mode of the engine under low load. The method includes commanding an exhaust valve actuator to increase lift of the exhaust valve to maximize expulsion of combustion chamber contents. The method also includes injecting into the combustion chamber sufficient amount of fuel after the lift of the exhaust valve was increased to generate substantially stoichiometric air-fuel ratio of the gas mixture contained in the chamber. The method also includes igniting the gas mixture after the fuel was injected into the combustion chamber to maximize combustion of the gas mixture. The method additionally includes commanding an intake camshaft phaser to change the position of the intake camshaft to a position configured for predetermined throttled SI combustion mode after the gas mixture was ignited to maximize operating efficiency of the engine.

20 Claims, 3 Drawing Sheets

(56) References Cited

U.S. PATENT DOCUMENTS

| | | | |
|---|---|---|---|
| 2009/0064951 A1* | 3/2009 | Rayl | F01L 1/185 123/90.15 |
| 2009/0099751 A1* | 4/2009 | Kuzuyama | F02B 1/12 701/102 |
| 2009/0229564 A1* | 9/2009 | Kang | F01L 1/34 123/295 |
| 2009/0229565 A1* | 9/2009 | Kang | F01L 1/344 123/295 |
| 2009/0234556 A1* | 9/2009 | Kang | F02B 1/08 701/102 |
| 2011/0168130 A1* | 7/2011 | Kang | F02D 41/0062 123/295 |
| 2011/0283972 A1* | 11/2011 | Wermuth | F02B 17/005 123/406.12 |

* cited by examiner

TRANSITION FROM HOMOGENEOUS CHARGE COMPRESSION IGNITION COMBUSTION MODE TO SPARK IGNITED COMBUSTION

TECHNICAL FIELD

The present disclosure is drawn to a system and a method for controlling transition in operation of an internal combustion engine under low load from a homogenous charge compression ignition (HCCI) combustion mode to a spark ignited (SI) combustion mode.

BACKGROUND

Internal combustion engines are often employed for powering vehicles, either as a primary power source, or as part of a hybrid powertrain. In the quest to maximize fuel efficiency, some modern internal combustion engines have been developed with the capability to selectively operate in and transition between compression ignition (CI) and spark ignited (SI) combustion modes while powering the host vehicle. However, if not managed properly, the transitions between CI and SI combustion modes may contribute to pollutant emissions. Additionally, such transitions between CI and SI combustion modes may generate unwanted disturbances in the vehicle's driveline that may, in turn, be transmitted to the vehicle passenger compartment and reduce passenger comfort.

SUMMARY

A method is provided for controlling an internal combustion engine via an electronic controller. The engine is capable of transitioning from homogenous charge compression ignition (HCCI) combustion mode to spark ignited (SI) combustion mode. The engine includes a combustion chamber provided with an intake valve actuated by an intake camshaft, and an intake camshaft phaser configured to change a position of the intake camshaft. The engine also includes an exhaust valve actuated by an exhaust camshaft, and an exhaust actuator configured to vary lift of the exhaust valve. The engine additionally includes a throttle configured to regulate entry of fresh air into the combustion chamber, a fuel injector configured to supply fuel into the combustion chamber, and a spark plug configured to generate a spark to ignite the fuel and air. Furthermore, the engine may include an exhaust camshaft phaser configured to change a position of the exhaust camshaft.

The method includes initiating a transition from HCCI to SI combustion mode of the engine under low engine load. The method also includes commanding the exhaust valve actuator to increase lift of the exhaust valve such that expulsion of combustion chamber contents is maximized. Additionally, the method includes injecting into the combustion chamber, via the fuel injector, a sufficient amount of fuel after the exhaust valve actuator is commanded to increase lift of the exhaust valve, such that substantially stoichiometric air-fuel ratio of pre-combustion, i.e., unburned, gas mixture contained in the combustion chamber is generated.

The method also includes igniting the gas mixture via the spark plug after the fuel is injected into the combustion chamber such that combustion and burn of the gas mixture are maximized. The method additionally includes commanding the intake camshaft phaser to change the position of the intake camshaft to a position configured for predetermined or nominal throttled SI combustion mode after the gas mixture was ignited, such that operating efficiency of the engine is maximized.

The exhaust actuator may vary the lift of the exhaust valve by switching cam lobes that activate the exhaust valve.

The method may also include commanding a predetermined optimal position of the throttle configured to minimize entry of fresh air into the combustion chamber. Also, the method may include retaining combusted or burnt gas mixture in the combustion chamber for one combustion cycle following the generation of the substantially stoichiometric air-fuel ratio of the gas mixture such that an amount of fresh air entering the combustion chamber is minimized. The method may additionally include controlling timing and duration of injection of the fuel and generation of the spark such that combustion efficiency is maximized. Furthermore, the method may include commanding a position of the throttle such that sufficient amount of air enters the combustion chamber for steady SI combustion mode at the substantially stoichiometric air-fuel ratio.

The engine may additionally include a crankshaft configured to reciprocate a piston thereby regulating a volume of the combustion chamber. In such a case, the method may also include injecting an amount of fuel sufficient to offset lean combustion, by about 3-15 degrees of rotation of the crankshaft prior to the generation of the spark. Additionally, the method may include retaining the combusted gas mixture in the combustion chamber for one combustion cycle following the generation of the substantially stoichiometric air-fuel ratio of the gas mixture by commanding rotation of the intake camshaft phaser after the one engine combustion cycle such that an amount of fresh air entering the combustion chamber is minimized.

The intake camshaft phaser may change the position of the intake camshaft by rotating the intake camshaft relative to a position of the crankshaft.

The engine may further include an intake valve actuator configured to vary lift of the intake valve. In such a case, the method may also include commanding a position of the throttle, such as less than or equal to 0.5% open, that is configured to minimize entry of fresh air into the combustion chamber after the command of injecting the amount of fuel. The method may additionally include commanding the intake valve actuator to increase the lift of the intake valve and the exhaust valve actuator to increase the lift of the exhaust valve.

The method may additionally include controlling timing and duration of injection of the fuel and generation of the spark following the generation of the substantially stoichiometric air-fuel ratio of the gas mixture and after the intake valve actuator was commanded to increase lift of the intake valve. The method may also include commanding the engine to operate at least one cycle after the timing and duration of injection of the fuel were controlled and the spark was generated.

The method may additionally include commanding the intake valve actuator to decrease lift of the intake valve after the timing and duration of injection of the fuel were controlled such that amount of fresh air entering the combustion chamber is minimized. Furthermore, the method may include commanding a predetermined position of the throttle and a predetermined position of the intake camshaft phaser, each being configured for steady SI combustion mode and combustion at the substantially stoichiometric air-fuel ratio.

The intake valve actuator may vary the lift of the intake valve by switching cam lobes that activate the intake valve.

A system and an engine having the controller configured to perform the above method are also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
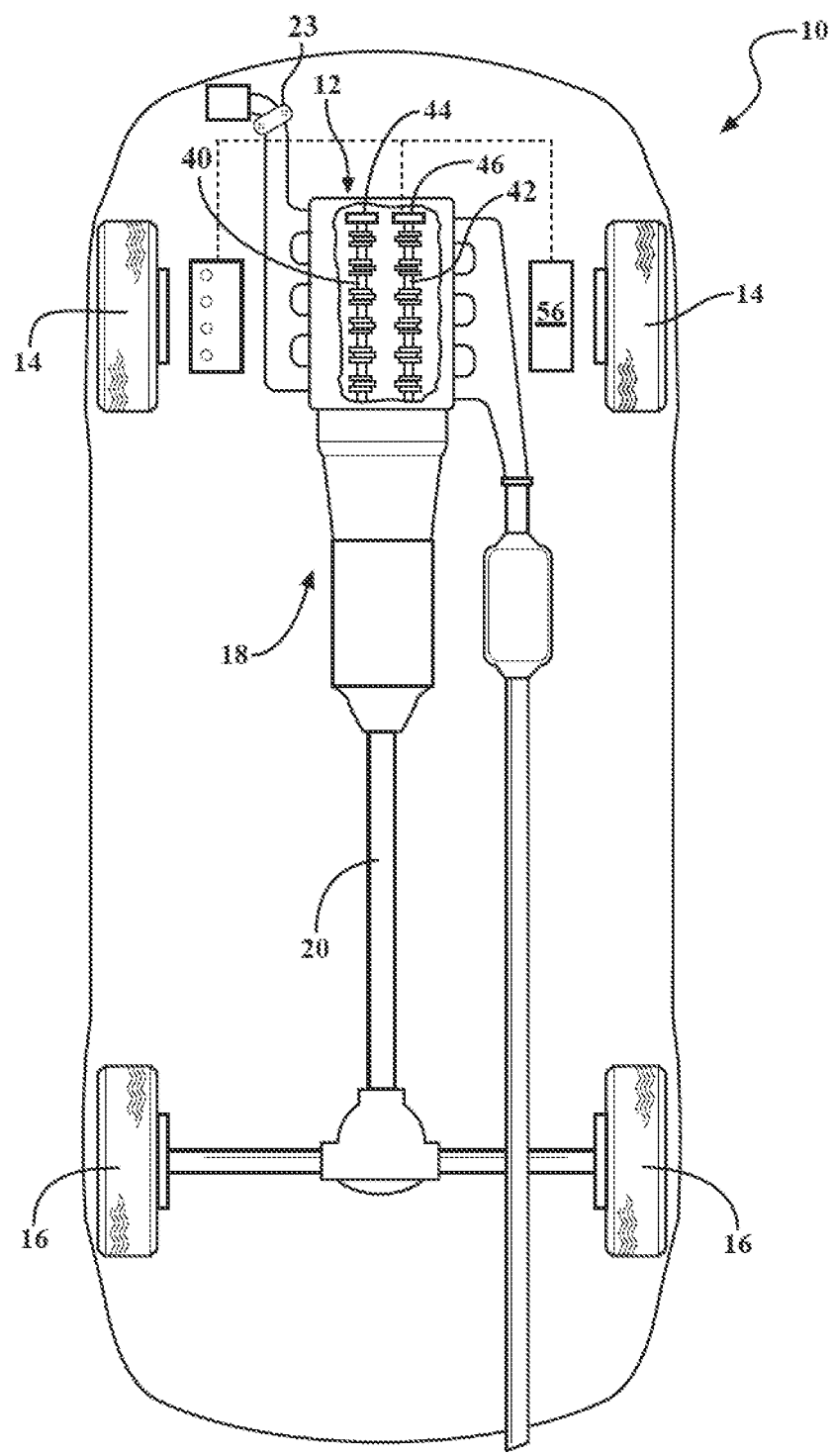
FIG. 1 is a schematic illustration of a vehicle including an internal combustion engine having a mechanism configured to provide variable valve timing and lift for the engine's intake valves.

Referring to the drawings, wherein like reference numbers refer to like components, FIG. 1 shows a schematic view of a vehicle 10. The vehicle 10 incorporates a powertrain that includes an internal combustion engine 12. The engine 12 applies its torque to the driven wheels 14 and/or 16 through a transmission 18 and via a drive or a propeller shaft 20 (as shown in FIG. 1). The engine 12 is configured, i.e., includes the appropriate hardware and is controlled, to transition between homogenous charge compression ignition (HCCI) combustion mode and spark ignited (SI) combustion mode for enhanced efficiency.

Figure 2:
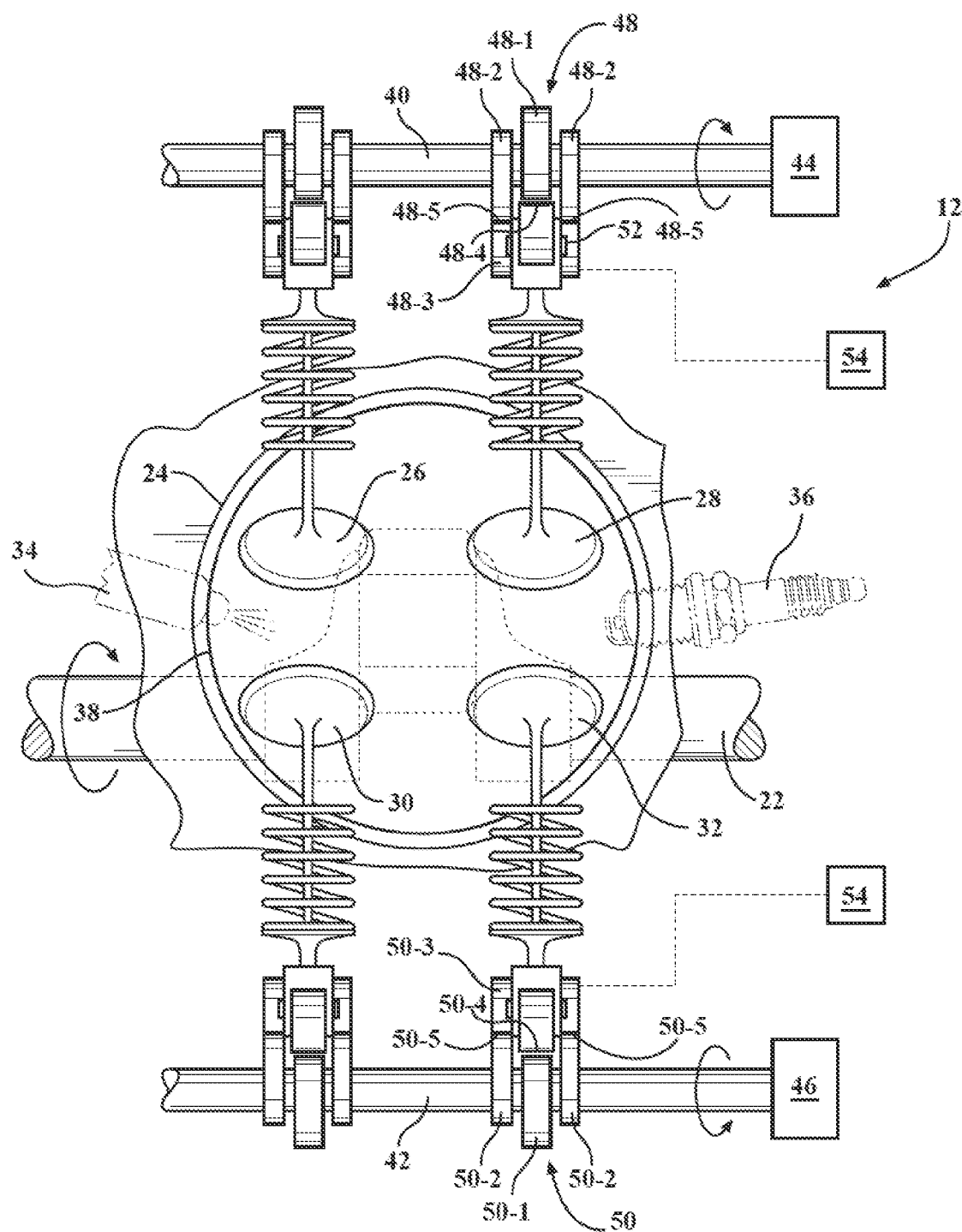
FIG. 2 is a schematic side view of a specific embodiment of the mechanism schematically depicted in FIG. 1.

As shown in FIG. 2, the engine 12 includes a crankshaft 22 and cylinders defining combustion chambers 24. Although a single combustion chamber 24 is shown, the engine 12 may include as many such combustion chambers as required by the specific design of the engine. The engine 12 also includes a throttle 23 (shown in FIG. 1), such as having a moveable throttle blade (not shown), configured to regulate an amount of air entering the combustion chambers 24. As shown in FIG. 2, each combustion chamber 24 may be provided with a first intake valve 26, a second intake valve 28, a first exhaust valve 30, and a second exhaust valve 32. Each intake valve 30, 32 is configured to control a supply of air or of air and fuel into the respective combustion chamber 24 when the engine 12 is propelling the vehicle 10. Each exhaust valve 30, 32 is configured to control the removal of post combustion exhaust gas from the respective combustion chamber 24. A fuel injector 34 is provided for each combustion chamber 24. The fuel injector 34 is configured to supply fuel into the respective combustion chamber 24. As shown, each combustion chamber 24 may also be provided with a spark plug 36 configured to generate a spark for commencing combustion of a mixture of air and fuel within the respective combustion chamber.

Each combustion chamber 24 also includes a piston 38 and a connecting rod that is not shown, but the existence of which would be appreciated by those skilled in the art. As additionally shown in FIG. 2, each piston 38 is configured to reciprocate under the force of combustion inside the respective combustion chamber 24, and thereby rotate the crankshaft 22 via the connecting rod and regulate volume of the combustion chamber. As will be appreciated by those skilled in the art, exhaust emissions, fuel efficiency, and power output of the engine 12 may each be affected by the duration and lift of opening and closure of intake valves 26, 28 and exhaust valves 30, 32. Additionally, the same engine performance parameters are also affected by the timing of opening and closure of intake valves 26, 28 and exhaust valves 30, 34 relative to top and bottom dead center positions of the respective piston 38. Although two intake valves 26, 28 and two exhaust valves 30, 32 are described herein and depicted in the figures, nothing precludes the engine 12 from being equipped with fewer or greater number of intake and exhaust valves.

As shown in FIG. 2, the intake valves 26, 28 are actuated by an intake camshaft 40, while the exhaust valves 30, 32 are actuated by an exhaust camshaft 42. Additionally, the engine 12 includes an intake camshaft phaser 44 configured to change a position of, i.e., rotate, the intake camshaft 40, and may also have an exhaust camshaft phaser 46 configured to change a position of the exhaust camshaft 42. The phasers 44, 46 provide engine 12 with control over the timing of opening and closing of the engine's intake valves 26, 28 and exhaust valves 30, 32, i.e., variable valve timing, by varying the position of the respective camshafts 40 and 42 relative to the crankshaft 22. The phasers 44, 46 may be operated, for example, by oil pressure, such that hydraulic force of the oil is employed for shifting the position of the camshafts 40, 42 relative to the crankshaft 22, thereby varying the timing of opening and closure of the engine's valves.

Furthermore, the engine 12 includes an intake actuator 48 configured to vary lift of the intake valves 26, 28 and an exhaust actuator 50 configured to vary lift of the exhaust valves 30, 32. Each of the intake and exhaust actuators 48, 50 is a mechanism that includes a set of first cam lobes 48-1, 50-1 and a set of second cam lobes 48-2, 50-2, respectively. As shown, each of the intake and exhaust actuators 48 and 50 also includes a set of rocker arms 48-3 and 50-3, respectively. Each rocker arm 48-3 and 50-3 has a first surface 48-4 and 50-4, respectively, configured to actuate an individual intake valve 26, 28 and exhaust valve 30, 32 via the first cam lobe 48-1 and 50-1, respectively, and generate a first valve lift profile. Each rocker arm 48-3 and 50-3 also has a second surface 48-5 and 50-5, respectively, configured to actuate the subject intake valve 26, 28 and exhaust valve 30, 32 via the second cam lobe 48-2, 50-2, respectively, and generate a second valve lift profile. Accordingly, the intake actuators 48 and 50 employ switchable cam lobes 48-1, 50-1 and cam lobes 48-2, 50-2 that activate the intake and exhaust valves, respectively, and thus vary the lift of the subject valves.

To generate variable lift of the respective intake valve 26, 28 and exhaust valve 30, 32, the first surface 48-4 and 50-4 is fixed relative to the respective camshaft 40, 42 while the second surface 48-5 and 50-5 is moveable or adjustable relative to the camshaft. The first lift profiles generated by the first surfaces 48-4 and 50-4 are lower than the second lift profiles generated by the second surfaces 48-5 and 50-5. Each of the intake and exhaust actuators 48, 50 also includes a device 52 that is configured to select one of the first surface 48-4, 50-4 and second surfaces 48-5, 50-5 of the respective rocker arms 48-3, 50-3 to actuate the valves 26, 28 and 30, 32.

The device 52 may be configured as a pin that is actuated by oil pressure. Such oil pressure may be regulated by an oil control valve 54, as shown in FIG. 2. Therefore, the device 52 selectively switches between the first cam lobes 48-1, 50-1 and the set of second cam lobes 48-2, 50-2, respectively to achieve the desired lift profile for the respective valves 26, 28 and 30, 32. Accordingly, intake valves 26 and 28 are actuated substantially synchronously by the individual first and second cam lobes 48-1, 48-2, while the exhaust valves 30 and 32 are actuated substantially synchronously by individual first and second cam lobes 50-1, 50-2 via individual rocker arms 48-3 and 50-3 to control supply of air or of air and fuel into the respective combustion chamber 24. Furthermore, the device 52 is also configured to select one of the first 48-4, 50-4 and second surfaces 48-5, 50-5 of the rocker arms 48-3, 50-3 to generate substantially synchronously a desired lift profile for both intake valves 26, 28 and 30, 32.

With resumed reference to FIG. 1, the vehicle 10 also includes a controller 56 configured to regulate the operation of the engine 12. The controller 56 includes a memory that is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Memory of the controller 56 may also include a floppy disk, a flexible disk, hard disk, magnetic tape, any other magnetic medium, a CD-ROM, DVD, any other optical medium, etc. The controller 56 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 56 or accessible thereby may be stored in the memory and automatically executed to provide the required functionality.

As part of controlling operation of the engine 12, the controller 56 is configured to initiate a transition from HCCI to SI combustion mode of the engine 12 under low load, i.e., when the engine is requested to deliver a relatively small percentage of its maximum torque output value, for example approximately up to 20% of the maximum value. The controller 56 is also configured to command the exhaust valve actuator 50 to increase lift of the exhaust valves 30, 32 such that expulsion of combustion chamber contents 24 is maximized. The controller 56 is additionally configured to inject into the combustion chamber 24 via the fuel injector 34 sufficient amount of fuel after the controller commands the exhaust valve actuator 50 to increase lift of the exhaust valves 30, 32, such that substantially stoichiometric air-fuel ratio of the pre-combustion, i.e., unburned, gas mixture contained in the combustion chamber is generated. As understood by those skilled in the art, the stoichiometric air-fuel ratio for combustion, such that exactly enough air is provided to completely burn all the fuel, which is 14.6:1 for combustion of gasoline fuel. Also, the controller 56 is configured to ignite the gas mixture via the spark plug 36 after the fuel has been injected into the combustion chamber 24, such that combustion of the gas mixture is maximized. Additionally, the controller 56 is configured to command the intake camshaft phaser 44 to change the position of the intake camshaft 40 to a position configured for predetermined nominal throttled SI combustion mode after the gas mixture was ignited, such that operating efficiency of the engine 12 is maximized. At low load conditions, the desired predetermined nominal throttled SI combustion mode employs Early Intake Valve closing (EIVC), which limits an amount of fresh air allowed to enter the combustion chamber to be mixed and ignited with fuel.

As part of a first specific control strategy, the controller 56 may be configured to also command a predetermined optimal position of the throttle 23 configured to minimize entry of fresh air into the combustion chamber. The above-noted predetermined position of the throttle 23 may be a position that provides an opening in the range of fully closed to a position of the throttle corresponding to a default spring loaded position, such as 0.5% of the throttle opening, as controlled by the throttle blade. The controller 56 may also be configured to retain combusted, i.e., burnt, gas mixture in the combustion chamber 24 for one combustion cycle following the generation of the substantially stoichiometric air-fuel ratio of the gas mixture by commanding early closing of the exhaust valve. Such retention of the gas mixture in the combustion chamber 24 for one combustion cycle has the effect of minimizing an amount of fresh air entering the combustion chamber. The controller 56 may additionally be configured to control an amount of injected fuel by varying the timing and duration of the fuel supplied via the fuel injector 34. In combination with controlling the amount of injected fuel, the controller 56 may control generation of the spark via the spark plug 36 to maximize combustion efficiency of the engine 12. Furthermore, following controlling of the amount of injected fuel and generation of the spark, the controller 56 may be configured to command a position of the throttle 23 to permit sufficient amount of air to enter the combustion chamber 24 for steady SI combustion mode at the substantially stoichiometric air-fuel ratio.

As part of a second specific control strategy, the controller 56 may be configured to inject an amount of fuel via the fuel injector 34 that is sufficient to offset lean combustion, i.e., combustion that would otherwise take place with less fuel than the amount established via the stoichiometric ratio. Such injection of fuel would precede generation of the spark by about 3-15 degrees of rotation of the crankshaft 22, thus controlling combustion through what is generally termed as "spray guided" operation. Additionally, the controller 56 may be configured to retain the combusted gas mixture in the combustion chamber 24 for one combustion cycle following the generation of the substantially stoichiometric air-fuel ratio of the gas mixture by commanding rotation of the intake camshaft phaser 44 after the one engine combustion cycle. Such retention of the gas mixture in the combustion chamber 24 for one combustion cycle has the effect of minimizing an amount of fresh air entering the combustion chamber. Accordingly, combustion inside the combustion chamber 24 would take place during lean conditions, but would stay stable, and be guided by the timing of injection of the fuel, because fuel injection timing and spark timing would be close together in time.

As part of a third specific control strategy, the controller 56 may be configured to command a position of the throttle, such as less than or equal to 0.5% open, that is configured to minimize entry of fresh air into the combustion chamber 24 after the fuel was injected. Additionally, the controller 56 may be configured to command the intake and exhaust valve lifts to high lift. Accordingly, the controller 56 may be configured to command the intake valve actuator 48 to increase lift of the intake valves 26, 28 for SI late intake valve closing operation and the exhaust valve actuator 50 to increase lift of the exhaust valves 30, 32. The controller 56 may also be configured to timing and duration of injection of the fuel via the fuel injector 34 and generation of the spark via the spark plug 36 following the generation of the substantially stoichiometric air-fuel ratio of the unburned gas mixture and increased lift of the intake valves 26, 28. Simultaneously, the HCCI mode position of the intake camshaft phaser 44 is maintained.

Additionally, the controller 56 may be configured to command the engine 12 to operate at least one cycle following the controlled timing and duration of injection of the fuel and generation of the spark. Therefore, such operation of the engine 12 takes place during the SI mode with late closing of the intake valves 26, 28. The controller 56 may also be configured to command the intake valve actuator 48 to decrease lift of the intake valve 26, 28 following timing and duration of injection of the fuel having been controlled. Accordingly, an amount of fresh air entering the combustion chamber 24 is thereby minimized. Furthermore, the controller 56 may also be configured to command a predetermined position of the throttle 23 and a predetermined position of the intake camshaft phaser 44, each configured for steady SI combustion mode and combustion at the substantially stoichiometric air-fuel ratio with early closing of the intake valves 26, 28.

Figure 3:
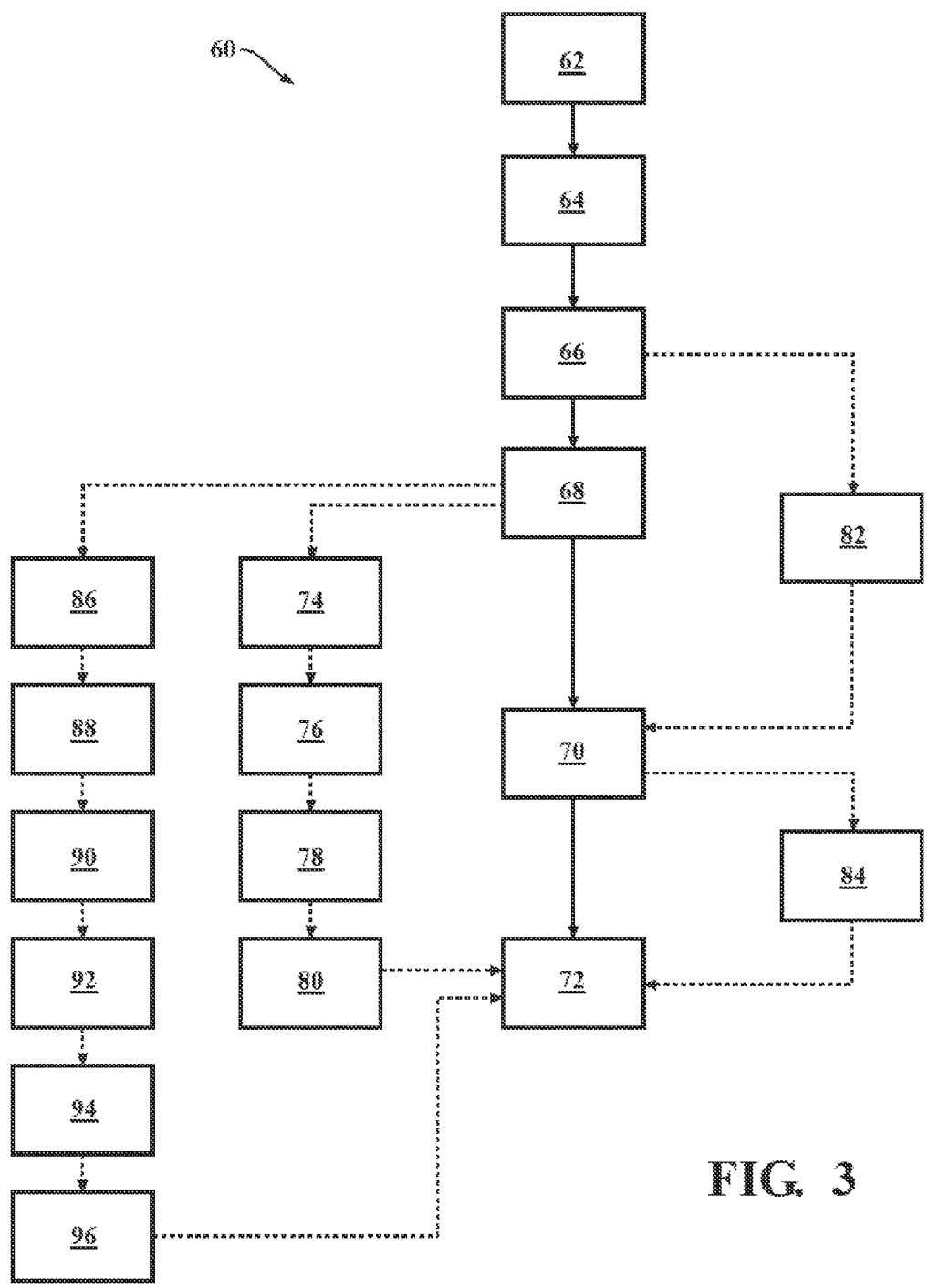
FIG. 3 is a flow diagram of a method of controlling the engine during transition from homogenous charge compression ignition (HCCI) combustion mode to spark ignited (SI) combustion mode depicted in FIG. 1.

FIG. 3 depicts a method 60 of controlling via an electronic controller 56 transition of the engine 12 from HCCI combustion mode to SI combustion mode, described above with respect to FIGS. 1 and 2. The method commences in frame 62 with the vehicle 10 progressing down the road at a measurable velocity, with the engine 12 being subjected to low load. The method then proceeds from frame 62 to frame 64 with the controller 56 initiating a transition from HCCI to SI combustion mode of the engine 12. Following frame 64, in frame 66 the method includes commanding the exhaust valve actuator 50 to increase lift of the exhaust valves 30, 32 such that expulsion of combustion chamber contents is maximized. Following the increasing of lift of the exhaust valves 30, 32, the method proceeds to frame 68.

In frame 68, the method includes injecting into the combustion chamber 24 via the fuel injector 34 sufficient amount of fuel such that substantially stoichiometric air-fuel ratio of the unburned gas mixture contained in the combustion chamber is generated. After frame 68, the method advances to frame 70, where it includes igniting the gas mixture via the spark generated by the spark plug 36, such that combustion of the gas mixture is maximized. Following frame 70, the method proceeds to frame 72. In frame 72 the method includes commanding the intake camshaft phaser 44 to change the position of the intake camshaft 40 to the position configured for predetermined throttled SI combustion mode, such that operating efficiency of the engine 12 is maximized, as described with respect to FIGS. 1-2.

According to the method 60, following frame 68 the method may advance to frame 74 for the first specific control strategy. In frame 74 the controller 56 may command a predetermined position of the throttle 23 configured to minimize entry of fresh air into the combustion chamber 24. Following frame 74 the method may proceed to frame 76 where it may include retaining combusted gas mixture in the combustion chamber 24 for one combustion cycle following the generation of the substantially stoichiometric air-fuel ratio of the gas mixture, such that an amount of fresh air entering the combustion chamber is minimized. After frame 76, in frame 78 the method may include controlling timing and duration of injection of the fuel and generation of the spark such that combustion efficiency of the engine 12 is maximized. Following frame 78, the method may advance to frame 80 with commanding a position of the throttle 23 such that sufficient amount of air enters the combustion chamber 24 for steady SI combustion mode at the substantially stoichiometric air-fuel ratio. The method may then proceed to and culminate the first specific control strategy in frame 72.

Additionally, according to the method 60, following frame 66 the method may advance to frame 82 for the second specific control strategy. In frame 82 the controller 56 may include injecting an amount of fuel sufficient to offset lean combustion, by about 3-15 degrees of rotation of the crankshaft 22 prior to the generation of the spark which takes place in frame 72. Following frame 72, the method may proceed to frame 84 where it includes retaining the burned gas mixture in the combustion chamber 24 for one combustion cycle by commanding rotation of the intake camshaft phaser 44 after the one engine combustion cycle, such that an amount of fresh air entering the combustion chamber is minimized. The method may then proceed to and culminate the second specific control strategy in frame 72.

Furthermore, according to the method 60, following frame 68 the method may advance to frame 86 for the third specific control strategy. In frame 86 the controller 56 may include commanding a position of the throttle 23 configured to minimize entry of fresh air into the combustion chamber 24. Following frame 86, the method may proceed to frame 88 where it includes commanding the intake valve actuator 48 to increase lift of the intake valves 26, 28 and the exhaust valve actuator 50 to increase lift of the exhaust valves 30, 32. After frame 88, the method may advance to frame 90 with controlling via the fuel injector 34 timing and duration of injection of the fuel and generation of the spark via the spark plug 36, while maintaining position of the phaser 44 for HCCI. Following frame 90, the method may proceed to frame 92 where it includes commanding the engine 12 to operate at least one cycle following the controlling of the timing and duration of injection of the fuel and generation of the spark. Following frame 92, the method may advance to frame 94 with commanding the intake valve actuator 48 to decrease lift of the intake valves 26, 28, such that the amount of fresh air entering the combustion chamber 24 is minimized. The method may then proceed to frame 96 where it includes commanding the predetermined position of the throttle 23 configured for steady SI combustion mode. Following frame 96, the method may proceed to and culminate the third specific control strategy in frame 72, where the predetermined position of the intake camshaft phaser 44 is commanded.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling, via an electronic controller, an internal combustion engine capable of transitioning from a homogenous charge compression ignition (HCCI) combustion mode to a spark ignited (SI) combustion mode, the method comprising:

initiating a transition from the HCCI to the SI combustion mode of the engine under low load, wherein the engine includes a combustion chamber provided with an intake valve actuated by an intake camshaft, an intake camshaft phaser configured to change a position of the intake camshaft, an exhaust valve actuated by an exhaust camshaft, an exhaust valve actuator configured to vary lift of the exhaust valve, a throttle configured to regulate entry of fresh air into the combustion chamber, a fuel injector configured to supply fuel into the combustion chamber, and a spark plug configured to generate a spark to ignite the fuel and air;

commanding the exhaust valve actuator to increase the lift of the exhaust valve such that expulsion of contents of the combustion chamber is maximized;

injecting, via the fuel injector, into the combustion chamber, a sufficient amount of fuel after said commanding the exhaust valve actuator to increase the lift of the exhaust valve such that a substantially stoichiometric air-fuel ratio of the gas mixture contained in the combustion chamber is generated;

igniting the gas mixture via the spark plug after said injecting a sufficient amount of fuel into the combustion chamber such that combustion of the gas mixture is maximized; and commanding the intake camshaft phaser to change the position of the intake camshaft to a position configured for a predetermined throttled SI combustion mode after said igniting the gas mixture.

2. The method of claim 1, further comprising varying the lift of the exhaust valve via the exhaust valve actuator by switching cam lobes that activate the exhaust valve.

3. The method of claim 1, further comprising:
commanding a predetermined position of the throttle configured to minimize entry of fresh air into the combustion chamber;
retaining combusted gas mixture in the combustion chamber for one combustion cycle following the generation of the substantially stoichiometric air-fuel ratio of the gas mixture such that an amount of fresh air entering the combustion chamber is minimized;
controlling a timing and a duration of said injecting of the fuel and said igniting the gas mixture such that combustion efficiency is maximized; and
commanding a position of the throttle such that sufficient amount of air enters the combustion chamber for steady SI combustion mode at the substantially stoichiometric air-fuel ratio.

4. The method of claim 1, wherein the engine additionally includes a crankshaft configured to reciprocate a piston thereby regulating a volume of the combustion chamber, the method further comprising:
injecting an amount of fuel sufficient to offset lean combustion, by about 3-15 degrees of rotation of the crankshaft prior to the generation of the spark; and
retaining combusted gas mixture in the combustion chamber for one combustion cycle following the generation of the substantially stoichiometric air-fuel ratio of the gas mixture by commanding rotation of the intake camshaft phaser after the one engine combustion cycle such that an amount of fresh air entering the combustion chamber is minimized.

5. The method of claim 4, further comprising changing the position of the intake camshaft via the intake camshaft phaser by rotating the intake camshaft relative to a position of the crankshaft.

6. The method of claim 1, wherein the engine further includes an intake valve actuator configured to vary lift of the intake valve, the method further comprising:
commanding a predetermined position of the throttle configured to minimize entry of fresh air into the combustion chamber after said commanding injecting the amount of fuel;
commanding the intake valve actuator to increase the lift of the intake valve and the exhaust valve actuator to increase the lift of the exhaust valve;
controlling a timing and a duration of said injecting of the fuel and said igniting the gas mixture following the generation of the substantially stoichiometric air-fuel ratio of the gas mixture and said commanding the intake valve actuator to increase the lift of the intake valve;
commanding the engine to operate at least one cycle following said controlling the timing and duration of injection of the fuel and generation of the spark;
commanding the intake valve actuator to decrease the lift of the intake valve following said controlling timing and duration of injection of the fuel such that an amount of fresh air entering the combustion chamber is minimized; and
commanding a predetermined position of the throttle and a predetermined position of the intake camshaft phaser, each configured for steady SI combustion mode and combustion at the substantially stoichiometric air-fuel ratio.

7. The method of claim 6, wherein varying the lift of the intake valve via the intake valve actuator is accomplished by switching cam lobes that activate the intake valve.

8. A system for controlling transition of an internal combustion engine from homogenous charge compression ignition (HCCI) combustion mode to spark ignited (SI) combustion mode, the system comprising:
an engine combustion chamber provided with an intake valve actuated by an intake camshaft, an intake camshaft phaser configured to change a position of the intake camshaft, an exhaust valve actuated by an exhaust camshaft, an exhaust actuator configured to vary lift of the exhaust valve, a throttle configured to regulate entry of fresh air into the combustion chamber, a fuel injector configured to supply fuel into the combustion chamber, and a spark plug configured to generate a spark to ignite the fuel and air; and
a controller configured to:
initiate a transition from HCCI to SI combustion mode of the engine under low load,
command the exhaust valve actuator to increase lift of the exhaust valve such that expulsion of combustion chamber contents is maximized;
inject into the combustion chamber via the fuel injector sufficient amount of fuel after said commanding the exhaust valve actuator to increase lift of the exhaust valve such that substantially stoichiometric air-fuel ratio of the gas mixture contained in the combustion chamber is generated;
ignite the gas mixture via the spark plug after said injecting of fuel into the combustion chamber such that combustion of the gas mixture is maximized; and command the intake camshaft phaser to change the position of the intake camshaft to a position configured for predetermined throttled SI combustion mode after said igniting the gas mixture.

9. The system of claim 8, wherein the exhaust valve actuator includes switchable cam lobes that activate the exhaust valve and configured to vary the lift of the exhaust valve by switching the cam lobes.

10. The system of claim 9, wherein the controller is additionally configured to:
command a predetermined position of the throttle configured to minimize entry of fresh air into the combustion chamber;
retain combusted gas mixture in the combustion chamber for one combustion cycle following the generation of the substantially stoichiometric air-fuel ratio of the gas mixture such that an amount of fresh air entering the combustion chamber is minimized;
control a timing and a duration of said injecting of the fuel and said igniting the gas mixture such that combustion efficiency is maximized; and
command a position of the throttle such that sufficient amount of air enters the combustion chamber for steady SI combustion mode at the substantially stoichiometric air-fuel ratio.

11. The system of claim 8, further comprising a crankshaft configured to reciprocate a piston thereby regulating a volume of the combustion chamber, wherein the controller is additionally configured to:
inject an amount of fuel sufficient to offset lean combustion, by about 3-15 degrees of rotation of the crankshaft prior to the generation of the spark; and
retain combusted gas mixture in the combustion chamber for one combustion cycle following the generation of the substantially stoichiometric air-fuel ratio of the gas mixture by commanding rotation of the intake camshaft phaser after the one engine combustion cycle such that an amount of fresh air entering the combustion chamber is minimized.

12. The system of claim 11, wherein the intake camshaft phaser is configured to rotate the intake camshaft relative to a position of the crankshaft to change the position of the intake camshaft.

13. The system of claim 8, further comprising an intake valve actuator configured to vary lift of the intake valve, wherein the controller is additionally configured to:
command a predetermined position of the throttle configured to minimize entry of fresh air into the combustion chamber after said commanding injecting the amount of fuel;
commanding the intake valve actuator to increase the lift of the intake valve and the exhaust valve actuator to increase the lift of the exhaust valve;
control a timing and a duration of the injection of the fuel and the ignition of the gas mixture following the generation of the substantially stoichiometric air-fuel ratio of the gas mixture and the command to the intake valve actuator to increase the lift of the intake valve;
command the engine to operate at least one cycle following said controlling the timing and duration of injection of the fuel and generation of the spark;
command the intake valve actuator to decrease the lift of the intake valve following the control of timing and duration of injection of the fuel such that an amount of fresh air entering the combustion chamber is minimized; and command a predetermined position of the throttle and a predetermined position of the intake camshaft phaser, each configured for steady SI combustion mode and combustion at the substantially stoichiometric air-fuel ratio.

14. The system of claim 13, wherein the intake valve actuator includes switchable cam lobes that activate the intake valve and configured to vary the lift of the intake valve by switching the cam lobes.

15. An internal combustion engine capable of transitioning from homogenous charge compression ignition (HCCI) combustion mode to spark ignited (SI) combustion mode, the engine comprising:
an engine combustion chamber provided with an intake valve actuated by an intake camshaft, an intake camshaft phaser configured to change a position of the intake camshaft, an exhaust valve actuated by an exhaust camshaft, an exhaust valve actuator configured to vary lift of the exhaust valve, a throttle configured to regulate entry of fresh air into the combustion chamber, a fuel injector configured to supply fuel into the combustion chamber, and a spark plug configured to generate a spark to ignite the fuel and air; and
a controller configured to:
initiate a transition from HCCI to SI combustion mode of the engine under low load,
command the exhaust valve actuator to increase lift of the exhaust valve such that expulsion of combustion chamber contents is maximized;
inject into the combustion chamber via the fuel injector sufficient amount of fuel after said commanding the exhaust valve actuator to increase lift of the exhaust valve such that substantially stoichiometric air-fuel ratio of the gas mixture contained in the combustion chamber is generated;
ignite the gas mixture via the spark plug after said injecting of fuel into the combustion chamber such that combustion of the gas mixture is maximized; and
command the intake camshaft phaser to change the position of the intake camshaft to a position configured for predetermined throttled SI combustion mode after said igniting the gas mixture.

16. The engine of claim 15, wherein the controller is additionally configured to:
command a predetermined position of the throttle configured to minimize entry of fresh air into the combustion chamber;
retain combusted gas mixture in the combustion chamber for one combustion cycle following the generation of the substantially stoichiometric air-fuel ratio of the gas mixture such that an amount of fresh air entering the combustion chamber is minimized;
control a timing and a duration of said injecting of the fuel and said igniting the gas mixture such that combustion efficiency is maximized; and
command a position of the throttle such that sufficient amount of air enters the combustion chamber for steady SI combustion mode at the substantially stoichiometric air-fuel ratio.

17. The engine of claim 15, further comprising a crankshaft configured to reciprocate a piston thereby regulating a volume of the combustion chamber, wherein the controller is additionally configured to:
inject an amount of fuel sufficient to offset lean combustion, by about 3-15 degrees of rotation of the crankshaft prior to the generation of the spark; and retain combusted gas mixture in the combustion chamber for one combustion cycle following the generation of the substantially stoichiometric air-fuel ratio of the gas mixture by commanding rotation of the intake camshaft phaser after the one engine combustion cycle such that an amount of fresh air entering the combustion chamber is minimized.

18. The engine of claim 17, wherein the intake camshaft phaser is configured to rotate the intake camshaft relative to a position of the crankshaft to change the position of the intake camshaft.

19. The engine of claim 15, further comprising an intake valve actuator configured to vary lift of the intake valve, wherein the controller is additionally configured to:
- command a position of the throttle configured to minimize entry of fresh air into the combustion chamber after said commanding injecting the amount of fuel;
- command the intake valve actuator to increase the lift of the intake valve and the exhaust valve actuator to increase the lift of the exhaust valve;
- control a timing and a duration of the injection of the fuel and the ignition of the gas mixture following the generation of the substantially stoichiometric air-fuel ratio of the gas mixture and the command to the intake valve actuator to increase the lift of the intake valve;
- command the engine to operate at least one cycle following said controlling the timing and duration of injection of the fuel and generation of the spark;
- command the intake valve actuator to decrease lift of the intake valve following the control of timing and duration of injection of the fuel such that an amount of fresh air entering the combustion chamber is minimized; and
- command a predetermined position of the throttle and a predetermined position of the intake camshaft phaser, each configured for steady SI combustion mode and combustion at the substantially stoichiometric air-fuel ratio.

20. The engine of claim 19, wherein the intake camshaft phaser is configured to rotate the intake camshaft relative to a position of the crankshaft to change the position of the intake camshaft and the intake valve actuator includes switchable cam lobes that activate the intake valve and configured to vary the lift of the intake valve by switching the cam lobes.

* * * * *